July 10, 1962  A. G. NEWBOLD  3,043,383
GROUND-DRILLING AUGER

Filed May 28, 1959  3 Sheets-Sheet 1

INVENTOR
Albert G. Newbold
BY Connolly and Hutz
ATTORNEYS

July 10, 1962   A. G. NEWBOLD   3,043,383
GROUND-DRILLING AUGER
Filed May 28, 1959   3 Sheets-Sheet 2
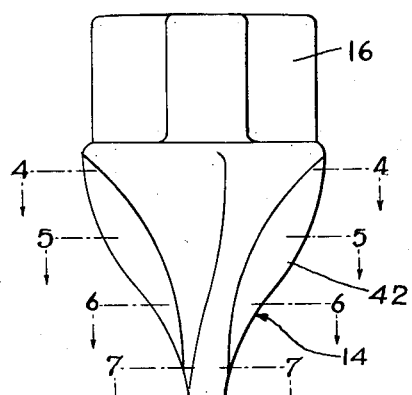
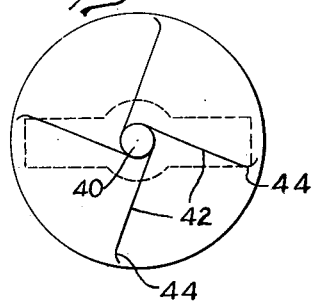
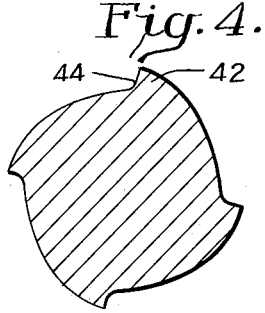
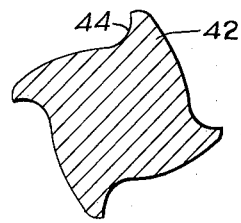
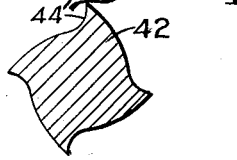
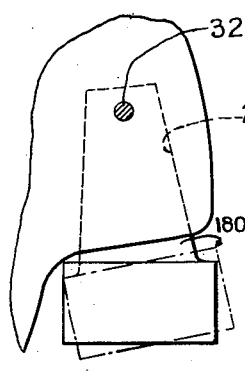
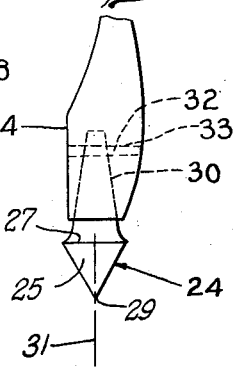
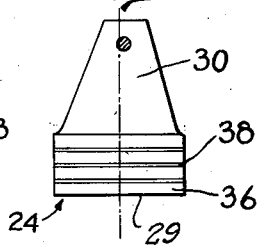
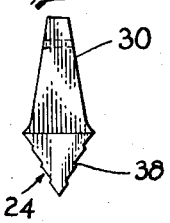
INVENTOR
Albert G. Newbold
BY Connolly and Hutz
ATTORNEYS July 10, 1962 A. G. NEWBOLD 3,043,383
GROUND-DRILLING AUGER Filed May 28, 1959 3 Sheets-Sheet 3

INVENTOR
Albert G. Newbold
BY Connolly and Hutz
ATTORNEYS

3,043,383
GROUND-DRILLING AUGER
Albert G. Newbold, Lima, Pa., assignor to Trainer Associates Inc., New Castle, Del., a corporation of Delaware
Filed May 28, 1959, Ser. No. 816,496
5 Claims. (Cl. 175—383)

This invention relates to a device for drilling holes through ground, and more particularly relates to such a device which is capable of drilling holes through ground materials of various types and consistencies.

Augers are a convenient means for drilling cylindrical holes through earth, for example, for receiving posts, poles or foundations. Special cutting bits have been mounted along the leading edge of their spiral blades to improve their drilling action through certain types of ground materials for which they have been respectively designed, and some improvement in operation has been provided by this expedient. However, considerable force is required to drive these existing toothed augers through compacted earth and special designs must be used if the consistency of the materials should drastically vary to consist, for example, of either normal ground, frozen ground, rocky ground, or hardpan.

An object of this invention is to provide a substantially universal ground-drilling auger which can be driven through different types of ground with a minimum expenditure of force; and Another object is to provide a structure for such an auger which facilitates the mounting and adjustment of removable teeth and a piercing point of substantially universal shape, and which minimizes wear upon them.

In accordance with this invention, wedge-shaped teeth are mounted within recesses formed upon the leading edge of the spiral web in line with the center of the plane of the web. The teeth, accordingly, smoothly divert spoil substantially evenly above and below the web, thereby minimizing the force required to drive the auger through various kinds of ground. Also, the wedge faces of the teeth may be rippled to prevent the spoil from adhering to them and causing undue drag. Efficient ground parting may also be enhanced by disposing lower teeth parallel to the plane of the web and upper teeth perpendicular to the plane of the web. A ground-piercing point incorporating a concavely curved lower end and convexly curved upper portion which is smoothly merged with the diameter of the shaft prepares a clean and smooth path for the web. For convenient adjustability, the tangs of the teeth are eccentrically formed in a plane parallel to the plane of the web, and their angle of attack is conveniently varied by inserting them within the recesses at orientations which vary 180°.

Novel features and advantages of the present invention will become apparent to one skilled in the art from a reading of the following description in conjunction with the accompanying drawings wherein similar reference characters refer to similar parts and in which:

FIG. 2 is a view in elevation of the point of the embodiment shown in FIG. 1;

FIG. 3 is a bottom view of the point shown in FIG. 2;

FIGS. 4–7 are cross-sectional views respectively taken through FIG. 2 along lines 4—4, 5—5, 6—6 and 7—7;

FIG. 8 is a schematic view of a portion of the spiral web of the embodiment shown in FIG. 1 having a representative tooth mounted upon it;

FIG. 9 is a side view of the portion shown in FIG. 8;

FIGS. 10 and 11 are plan and side views respectively of the tooth shown in FIGS. 8 and 9;

Figure 1:
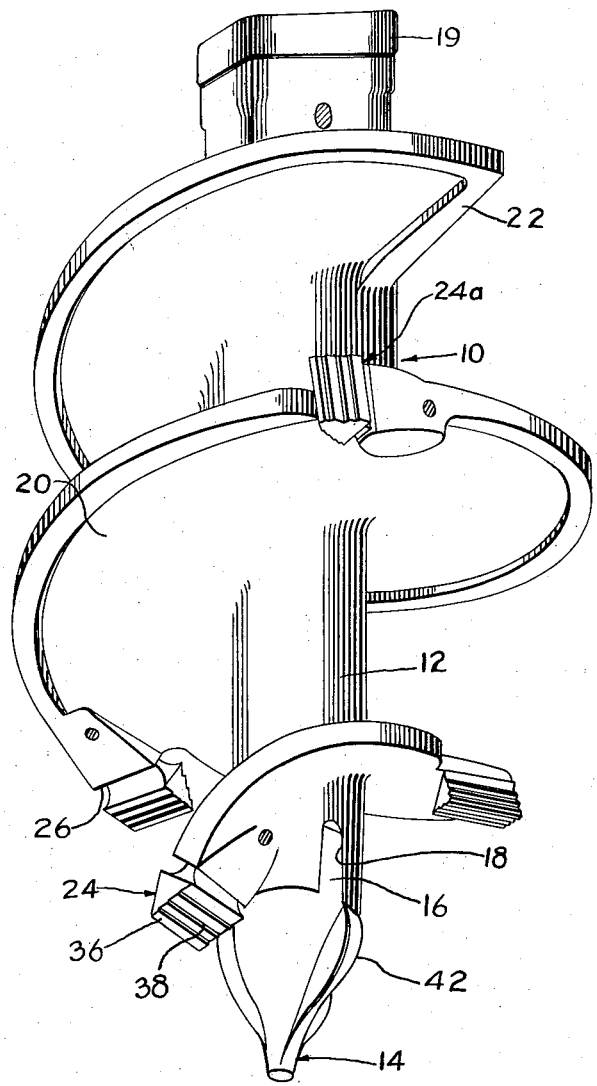
FIG. 1 is a perspective view of one embodiment of this invention.
Figure 12:
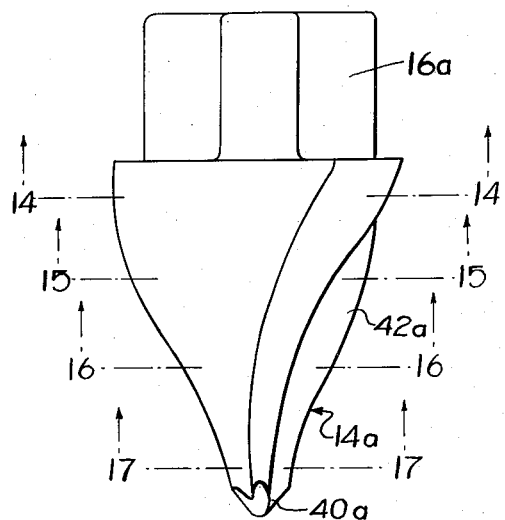
FIG. 12 is a view in elevation of a modification of the point shown in FIG. 2.
Figure 14:
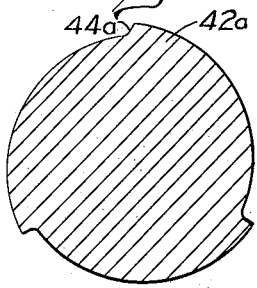
FIGS. 14–17 are cross-sectional views respectively taken through FIG. 12 along the lines 14—14, 15—15, 16—16 and 17—17.
Figure 15:
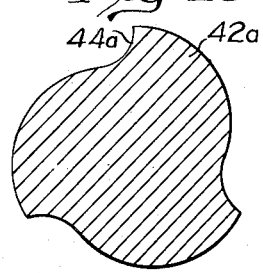
Figure 13:
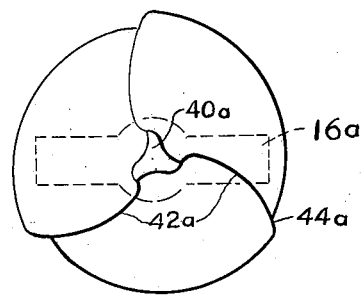
FIG. 13 is a bottom view of the point shown in FIG. 12.
Figure 16:
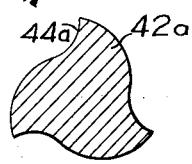
Figure 17:

In FIG. 1 is shown a universal ground-drilling auger 10 including an axial shaft 12 at whose lower end is mounted a ground-piercing point 14 by insertion of tongues 16 of point 14 within corresponding grooves 18 in the lower end of the shaft 12. A set of one tongue and groove 16 and 18, provides firm and rigid anchoring of point 14 to the lower end of shaft 12. Chuck 19 at the top of shaft 12 provides a means for attaching auger 10 to a rotating source of power.

A spiral web 20 commences at the lower portion of shaft 12 substantially close to the circumference of the shaft and gradually widens as it spirals upwardly to a larger spiral web or radial extension at its upper end 22 adjacent the top of shaft 12. Wedge-shaped auger teeth or cutting bits 24 are mounted at selected points about the periphery of the leading edge of web 20 in a manner which centers the line of action of these teeth with respect to the plane of web 20. Cutting or auger bits 24 as shown in FIGS. 1 and 8–11 have laterally extended isoceles triangular wedge-shaped heads 25 with their equiangular bases 27 connected to tangs 30. The laterally extended vertex edges 29 of heads 25 are also disposed in front of the tangs. The leading edge of web 20 is accordingly notched to provide pockets 26 in the leading edge of the web which are centrally bored to provide recesses 28 shown in FIG. 8 for receiving the tangs 30 of auger teeth 24. Pins 32, which may be tapered, for example, are inserted through holes 33 into enlarged portions 34 of web 20 to secure tangs 30 within recesses 28. When cutter bits 24 are inserted within recesses 28, the vertex edges 29 and the central plane 31 including these vertex edges 29 are substantially aligned with a central plane of web 20. In addition the bases 27 of heads 25 are substantially equal in thickness to the adjacent leading edge of web formed by pockets or substantially flat indentations 26 for smoothly diverting the spoil cut by vertex edges 29 evenly above and below web 20 as the auger is rotated into the ground. These tangs 30 are, for example, eccentrically formed in a plane parallel to the plane of web 20 as shown in FIG. 10 to permit the angle of attack of teeth 24 to be varied from a leading position shown in full outline in FIG. 8 to a lagging position shown in broken outline in FIG. 8 when their mode of insertion is varied 180° upon insertion into recess 28. The faces 36 of teeth 24 are, for example, broken by ripples or waves 38 to prevent particles of earth from adhering to these faces as they pass through the earth. The lower auger teeth 24 are, for example, mounted to lie in a plane parallel to the plane of web 20 whereas one or more teeth 24a mounted upon an upper portion of web 20 lie perpendicular to the plane of the web which in combination provides extremely smooth and clean parting action.

Ground-piercing point 14 shown in detail in FIG. 3 includes a substantially blunt lower end 40 and spiral flukes 42 four in number, for example, which are substantially aligned with the direction of action of spiral web 20. The lower portion of point 14 is concavely curved, for example, between section-cutting lines 6 and 7 in FIG. 2 which then transforms into a convexly curved portion thereby allowing point 14 to gradually enlarge to the cross section of shaft 12. Channels 44 are formed by the concave portions of the roots of flukes 42 thereby providing a smooth path for the spoil to travel from the point toward the spiral web.

In FIGS. 12–17 is shown a modified ground-piercing point 14a which is formed in a manner similar to point 14 shown in FIGS. 2–7 with the exception that three spiral flukes 42a are equidistantly disposed about its sides instead of the four flukes shown in FIGS. 2–7. For some reason that is not completely understood, point 14a, having three flukes, penetrates a little more deeply and cleanly through most materials, and for most applications it is, therefore, preferable to the four-fluked point shown in FIGS. 2–7. However, the fact that channels 44a for conducting spoil along point 14a are slightly deeper might help improve its penetrating efficiency over point 14. Lower pointed end 40a is, for example made strong and effective in penetrating action when it is formed as not less than a forty-five degree included angle, and end 40a is, for example, made approximately in the form of a 90° included angle.

When auger 10 is rotated into the ground, point 14 penetrates deeply with little effort, and its initial concave profile and substantially deep channels 44 smoothly conduct the initially encountered spoil past it. After this spoil is smoothly diverted toward the leading end of spiral web 20 by the transition of the point to its convex profile, the leading end of web 20 within which is mounted a wedge-shaped auger tooth 24, smoothly follows it into the earth. The wedge-shaped configuration of tooth 24 and its central disposition relative to the plane of web 20 smoothly diverts the earth above and below the blade imparting a relatively streamlined cutting action to the web regardless of the character or consistency of the ground. The web, accordingly, moves in a straightforward spiral or corkscrew action through the earth with teeth 24 cutting a clean path before it, rather than attempting to shear or lift the ground solely to a position above the blade, which greatly minimizes the force necessary to rotate the auger through the earth. This rotational force is further minimized by the ripples 38 on the faces 36 of teeth 24 which prevents any ground particles from adhering to the faces of the teeth and dragging or impeding their motion. Since the tangs 30 of teeth 24 are mounted and protected within bores 28 in enlarged portions 34 of web 20, they are not exposed to cutting action and thereby may be made extremely tough to prevent them from being subject to embrittlement. This internal mounting of tangs 30 also protects the mounting arrangement from wear and facilitates replacement when teeth 24 are broken or worn out.

The eccentric formation of tangs 30 as shown in FIG. 10 and in the alternate 180° modes of engagement shown in FIG. 8 permits the angle of attack of teeth 24 to be varied from a leading to a lagging position in accordance with the character of the ground being drilled. The leading form of mounting shown in full line in FIG. 8 provides efficient cutting through softer ground whereas the lagging position provided by 180° reversal of insertion shown in broken outline in FIG. 8 provides more efficient cutting action through denser and harder ground such as frozen or rocky or even hardpan.

Teeth 24 and point 14 may be hard faced to improve the penetrating ability of these elements when used in drilling harder ground materials such as hardpan or rocky ground. These elements are hard faced, for example, by applying a hard material such as one containing tungsten carbide particles to their cutting faces. Because of the unique universal penetrating efficiency of these elements through a wide variety of grounds of different hardness and constitution, merely varying the hardness of the active portions of the teeth and penetrating point will allow the auger of this invention to be used efficiently for drilling almost every type of ground formation regardless of individual constitution or hardness, whereas at least four different types of existing augers must be separately used to cover the same range of variation of ground type.

The efficiency of ground-piercing points 14 and 14a may be attributed to the piercing ability of their concentrated lower ends or blunt points 40 and 40a followed by the smaller lower ends of the flukes which are small enough to break through the ground with a minimum of resistance to prepare the way for the larger extension of the upper fluke sections. The concave-convex transition of the points 14 and 14a together with this fluke arrangement gradually enlarges the hole and prepares a remarkably smooth entry for the spiral web and its incorporated teeth.

What is claimed is:

1. A ground drilling auger comprising an axial shaft, a spiral web connected about said shaft, the outer edge of said spiral web being relatively close to said shaft at its bottom end and gradually extending outwardly to a relatively larger radial extension at the upper end of said shaft, auger bits having laterally extended isosceles triangular wedge-shaped heads with their equiangular bases connected to tangs and laterally extended vertex edges disposed in front of said tangs, substantially flat indentations formed at spaced positions about said web for receiving said auger bits, recesses extending within the portions of said web, in back of each of said indentations for receiving said tangs of said auger bits with said wedge-shaped heads disposed in front of said substantially flat indentations, said tangs and said recesses being formed to substantially align said vertex edges and the central planes of said wedge-shaped heads including said vertex edges with a central plane of said web, said bases of said heads being substantially equal in thickness to said web for smoothly diverting the spoil cut by said vertex edges evenly above and below said web as said auger is rotated into the ground in the direction of said spiral, said tangs being inserted within said recesses and, securing means attaching said auger bits to said web, and a ground piercing point being secured to the bottom of said shaft for facilitating the entry of said auger into the ground.

2. A ground drilling auger as set forth in claim 1 wherein upper portions of said web are formed to have a substantially constant radial extension relative to said shaft, one of said substantially flat indentations upon said substantially fixed radial extension of said web being disposed to receive one of said auger bits in a substantially perpendicular orientation of its head and vertex edge relative to the plane of said web at the side of said web for scraping clean the sides of the hole being cut by said auger.

3. A ground drilling auger as set forth in claim 1 wherein said tangs of auger bits and said recesses are formed eccentrically relative to the centerline of said wedge-shaped head in the plane of said web when inserted therein for permitting the angle of attack of said vertex edge of said auger bits to be varied by inserting said tangs within said recesses at orientations which vary 180° from each other.

4. A ground drilling auger as set forth in claim 1 wherein ripples are formed in the faces of said wedge-shaped teeth disposed substantially parallel to said vertex edges for preventing spoil from sticking to said web as said auger bits are forced through the ground.

5. A ground drilling auger as set forth in claim 1 wherein said ground piercing point includes a lower portion which is concavely shaped to a blunt point and an upper portion which is smoothly convexly merged with the outside surface of said shaft.

References Cited in the file of this patent
UNITED STATES PATENTS

| | | |
|---|---|---|
| 123,847 | Spees | Feb. 20, 1872 |
| 143,535 | Sheldon | Oct. 7, 1873 |
| 1,465,407 | Bashara | Aug. 21, 1923 |
| 1,848,192 | Newman | Mar. 8, 1932 |
| 1,859,717 | Rutrle | May 24, 1932 |
| 2,221,680 | Parrish | Nov. 12, 1940 |
| 2,340,216 | Gill | Jan. 25, 1944 |
| 2,594,261 | Henning | Apr. 22, 1952 |
| 2,709,573 | Reed | May 31, 1955 |

FOREIGN PATENTS

| | | |
|---|---|---|
| 7,617 | Austria | Sept. 3, 1900 |